Aug. 22, 1944. E. J. E. DEWOITINE 2,356,571
MACHINE FOR MILLING THE FLANGES OF AIRPLANE WING SPARS
Filed April 10, 1940 9 Sheets-Sheet 1
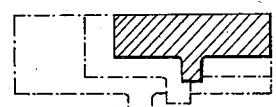
Fig.1
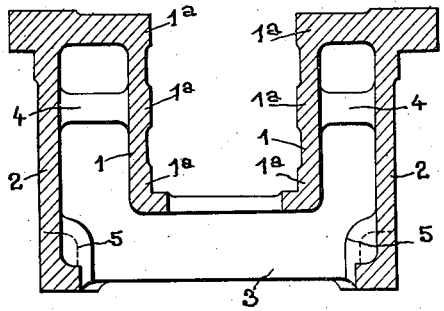
Fig.5.
Fig.6.
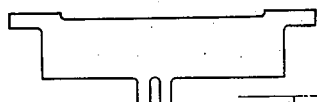
Fig.2
Fig.3
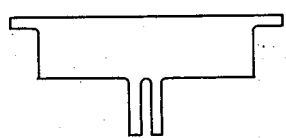
Fig.4
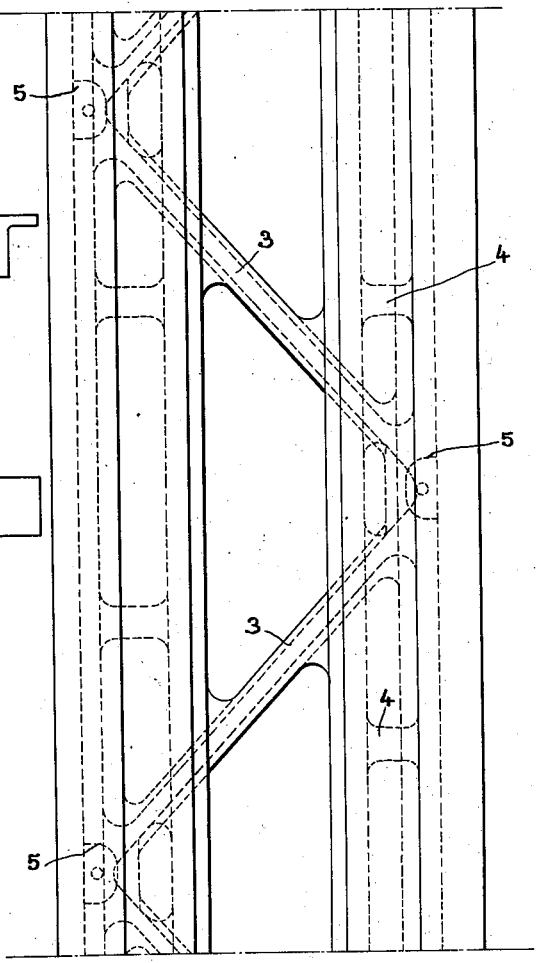
INVENTOR:
EMILE JULIEN EUGENE DEWOITINE
BY: Haseltine, Lake & Co.
ATTORNEYS Aug. 22, 1944.   E. J. E. DEWOITINE   2,356,571
MACHINE FOR MILLING THE FLANGES OF AIRPLANE WING SPARS
Filed April 10, 1940   9 Sheets-Sheet 2

INVENTOR:
EMILE JULIEN EUGENE DEWOITINE
BY: Haseltine, Lake & Co.
ATTORNEYS

INVENTOR:
EMILE JULIEN EUGENE DEWOITINE
BY: Haseltine, Lake & Co
ATTORNEYS

Aug. 22, 1944.  E. J. E. DEWOITINE  2,356,571
MACHINE FOR MILLING THE FLANGES OF AIRPLANE WING SPARS
Filed April 10, 1940  9 Sheets-Sheet 5

INVENTOR:
EMILE JULIEN EUGENE DEWOITINE
BY: Haseltine, Lake & Co.
ATTORNEYS

Aug. 22, 1944.   E. J. E. DEWOITINE   2,356,571
MACHINE FOR MILLING THE FLANGES OF AIRPLANE WING SPARS
Filed April 10, 1940    9 Sheets-Sheet 6

INVENTOR:
EMILE JULIEN EUGENE DEWOITINE
BY: Haseltine, Lake & Co.
ATTORNEYS

Aug. 22, 1944. E. J. E. DEWOITINE 2,356,571
MACHINE FOR MILLING THE FLANGES OF AIRPLANE WING SPARS
Filed April 10, 1940 9 Sheets-Sheet 9

INVENTOR:
EMILE JULIEN EUGENE DEWOITINE
BY: Haseltine, Lake & Co.
ATTORNEYS

Patented Aug. 22, 1944

2,356,571

UNITED STATES PATENT OFFICE 2,356,571

MACHINE FOR MILLING THE FLANGES OF AIRPLANE WING SPARS

Emile Julien Eugène Dewoitine, Neuilly-sur-Seine, France; vested in the Alien Property Custodian Application April 10, 1940, Serial No. 328,824
In France May 24, 1939

6 Claims. (Cl. 90—13)

The present invention has for its object improvements in machines for milling the flanges of airplane wing spars of the type described and illustrated in the French patent application No. 847,783 dated June 23, 1938, for "Machine for milling the flanges of airplane wing spars."

The machines of this kind comprise a table receiving the spar and the inclination of which table is adjustable relatively to a bed along which move the milling-cutter carriages.

These improvements are adapted to reinforce the construction and in particular, to increase the working capacity of machines of this type, as well as their output whilst facilitating the direction thereof. They are mainly characterised by the following points applicable separately and in any combinations:

1. The bed anchored on a base or a mass of concrete, is constituted by a beam the cross section of which is substantially M-shaped, and in the axial conduit of which is arranged the table receiving the spar to be machined, vertical ribs bracing the sides according to a triangular distribution the apices of the triangles alternating from one side to the other.

2. The table is constituted by an I-shaped beam laterally closed by two welded flat members (electric welding for instance) and perforated at intervals for the passage of the screws securing said table to the bed, the upper flange being reinforced by a seating secured in position and axially grooved for centering the plates supporting the spars.

3. The plates for securing the spars are of three types respectively improving the arrangement: to machine the inner face of the spar flanges, to machine the longitudinal edges of the flanges, to machine the outer face of the flanges.

They are centered on the table by engaging a longitudinal rib or bar in the axial groove of said table. The spars are secured in position on the plates by means of a mechanism provided with pistons subjected to the thrust of one and the same fluid under pressure.

4. The saddle supporting the movable heads with their milling-cutter arbors is devised in the form of a bridge and is constituted by a caisson supported by two hollow lateral uprights which rest on the longitudinal slideways of the bed, each end of the caisson being devised for receiving the movable heads.

5. The removable heads are of two types: one having a vertical spindle, the other a horizontal spindle, and the saddle can receive: a head having a horizontal spindle and a head having a vertical spindle; a head having a horizontal spindle and two heads having vertical spindles; four heads having vertical spindles.

6. The vertical spindle head comprises a front part in which are arranged the spindle and its mechanisms and accessory members and which is mounted in the vertical slideway of a carriage horizontally guided in a slideway of the saddle.

7. The horizontal spindle head comprises a front part in which are arranged the spindle and its mechanisms and accessory members and which is supported in the circular slideways of a carriage vertically guided in the slideways of a second carriage guided in the horizontal slideways of the saddle.

8. The carriages which, for the heads having vertical spindles and a horizontal spindle, are horizontally guided on the saddle, are held at the upper part of the latter by ball bearings distributed in two groups with the axes located in two perpendicular planes, the guiding at the lower part of the saddle being ensured by a simple dove-tail arrangement.

9. The front part of the head having a vertical spindle is vertically adjusted in the vertical slideway of its carriage by pressing on a vertically arranged abutment screw.

10. The horizontal displacements on the saddle of the carriage carrying the vertical spindle head are automatically controlled during the displacements of the saddle, by means of a roller guided by a copying path secured to the bed.

11. The roller according to 10 is resiliently restored on to the copying path and mounted in such a manner as to be set in a vertical slide-block provided with rack teeth connected by a suitable pinion to a horizontal rack provided on the carriage of the vertical spindle head, in order to convert the vertical displacements of the copying roller into transverse displacements of said carriage.

12. The control of the milling-cutters of the horizontal and vertical spindles is ensured by one and the same electric motor having a vertical axis, mounted at the upper part of the saddle, the shaft of the motor engaging with a reducing gear, the ratio of which is adjustable by substituting pinions, and which comprises three primary shafts: a shaft for controlling the horizontal spindle; two shafts for controlling the two vertical spindles, when two vertical spindle heads are simultaneously mounted on the saddle.

13. The connection between the secondary shafts of the reducing gear according to 12 and each of the spindles to which they correspond is made by means of extensible double cardan shafts.

14. The displacements of the saddle on the bed of the machine are ensured by a distinct electric motor mounted at the upper part of the saddle with its shaft vertically arranged, as the motor controlling the spindles, and connected to a reducing device arranged in a box secured to the saddle and carrying a manually controlled winch, the secondary shaft of the reducing device carrying a pinion rolling on a rack secured to the bed of the machine.

Other advantageous particularities of the invention will be set forth in the following description which relates to a form of construction of a machine for milling the flanges of airplane wing spars, to which are simultaneously applied all the features above defined. This form of construction is illustrated, by way of example only, in the accompanying drawings in which:

Fig. 1 is a cross section of one of the typical angle members which can be cut on the machine forming the subject-matter of the invention, for constituting the flanges of airplane wing spars.

Figs. 2, 3, 4 are end views of spar flanges which can be obtained with the machine forming the subject-matter of the invention.

Fig. 5 is a vertical cross section of the bed of the machine.

Fig. 6 is a partial plan view of the bed.

Figure 7:
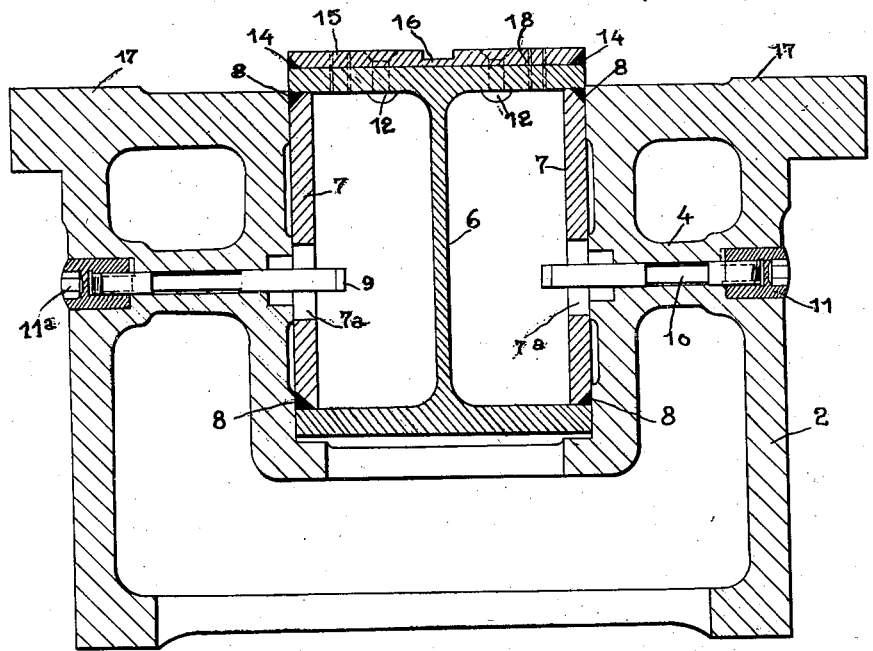
Fig. 7 is a vertical cross section, on an enlarged scale, of the bed with the table mounted thereon.

The machine according to the invention allows the complete machining of the flanges of wing spars, long angle members made of Duralumin, of variable cross section, and without necessitating any dressing or finishing. It allows, in particular, of machining angle members made of Duralumin, of great length and the typical shape of section, the dimensions being variable, is that shown in Fig. 1.

Starting from these typical angle members, can be obtained in particular, flanges of airplane wing spars, the end view of which is shown in Figs. 2 to 4, the width, and the thickness being variable as well as the slopes in the transverse and in the longitudinal directions.

As previously known machines of this type, the machine comprises a fixed bed which supports the angle member to be machined and on which moves a saddle carrying the required milling-cutters.

According to a feature of the invention, the bed is constituted by a beam, preferably made of perlitic pig iron of great resistance and hardness, the cross section of which is substantially M-shaped as shown in Figs. 5 and 6. The facing inner sides 1 of the central portion limit the housing of the table which will be described hereinafter and the lateral guiding of which is ensured by contact with faced bearing surfaces 1ᵃ. The inner sides 1 and outer sides 2 of the bed are braced by oblique ribs 3 distributed along the structure and which form an extremely rigid triangular system. The sides 1 and 2 are moreover braced by bosses 4 provided for the passage of the special bolts which ensure the locking of the table as explained hereinafter. The bed is mounted on a concrete base to which it is anchored by fixing bolts the nuts of which are housed in pockets 5 formed at the lower part of the outer sides 2, and inwardly offset within the bed, so that the latter do not constitute a projection capable of limiting the accessibility of the members to be machined mounted on the machine.

At one of the ends of the bed is provided the mechanism for adjusting the longitudinal inclinations of the table. The latter is pivoted, at its opposite end, on a pivot or transverse pin secured on the bed and the mechanism for adjusting the inclinations is, substantially that described in the French Patent No. 847,783 dated June 23, 1938, for "Machine for milling the flanges of airplane wing spars" in the name of the applicant.

The table shown in cross section Fig. 7, is constituted by a beam 6, preferably a "Grey" beam, the two flanges of which are braced by flat members 7 electrically welded at 8 and perfectly surfaced externally so as to exactly fit between the bearings 1ᵃ of the bed.

At right angles with each of the bosses 4 of the bed, the flat members 7 are apertured at 7ᵃ for the passage of the special head 9 of the locking bolts 10 guided in the bosses 4. The screw threaded end of each bolt is threaded into a nut 11 completely embedded in a perforation formed in the sides 2 of the bed and manipulated by a special wrench engaged in the polygonal hole 11ᵃ. These bolts are loosened for allowing the inclination of the table to be adjusted, then locked for holding the latter stationary during the work.

On the upper flange of the beam 6 of the table is mounted and secured, for instance by means of rivets 12 and of lines of electric welding 14, a seating plate 15 the upper surface of which is faced parallel to the surfaces 17 of the lateral slideways of the bed.

Figure 8:
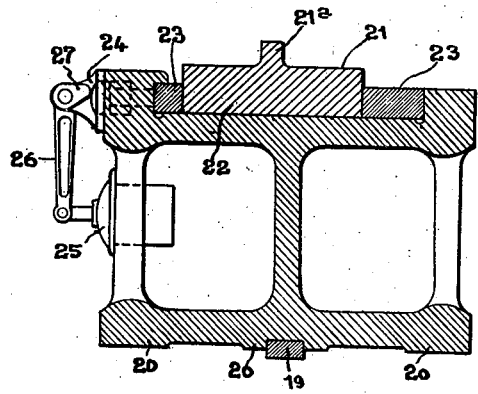
Figs. 8, 9 and 10, are cross sections of plates for securing the spar flanges on the table of the machine.

A longitudinal groove 16 is cut on the seating plate for centering the plates supporting the angle members to be machined. Tapped holes 18 are also provided in the plate 15 and in the upper flange of the beam 6 for the securing screws or bolts of said plates. The latter are of three types illustrated in Figs. 8 to 10. They are made for instance of pig iron and carry, on the lower face, an axial guide-strip 19 which engages in the groove 16 formed in the table. The lower face has three faced bearings 20 which press against the upper face of the seating plate 15, the locking being ensured by screws and bolts screwed in the holes 18 and not shown.

The first type allows machining an angle member 21, on its inner face, that is to say on the side where its rib 21ᵃ is located which must be axially grooved. The angle member 21 presses through its outer face on the machined faces 22 of the caisson and it is locked between space blocks 23 by the action of small pistons 24 controlled by a common hydraulic pressure. With this arrangement, the locking pressure is distributed as uniformly as desired. The fluid under pressure is led to a single conduit from which it is supplied to the cylinders 25 distributed on the plates whatever may be the type thereof. In the examples illustrated, the pistons of the cylinders 25 act, through the medium of a lever 26 on a cam 27 locking the pistons 24. In the type of plate shown in Fig. 10, the angle member 21 is machined on its lower face. It is held on the plate by locking its rib 21ᵃ between the space blocks 23 subjected to the thrust of the pistons 24 already desrcibed. If the rib 21ᵃ is already axially grooved, it is reinforced by the engagement of a shaped wedge 28. For suitably distributing the locking stresses, wedges 29, or a single wedge of the required width, are arranged between the space blocks 23.

Figure 9:
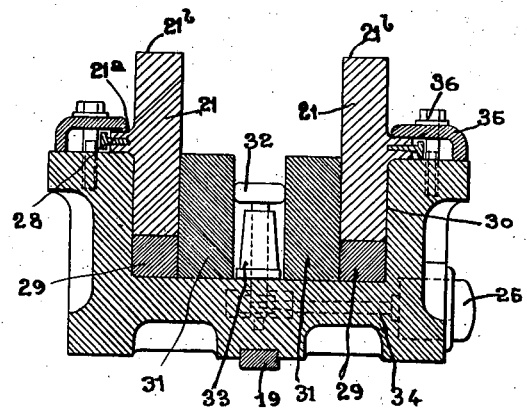
Figure 10:
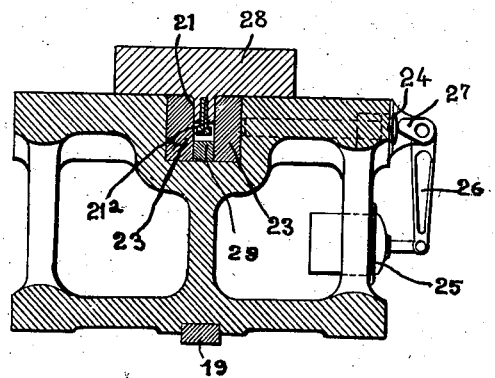
Figure 11:
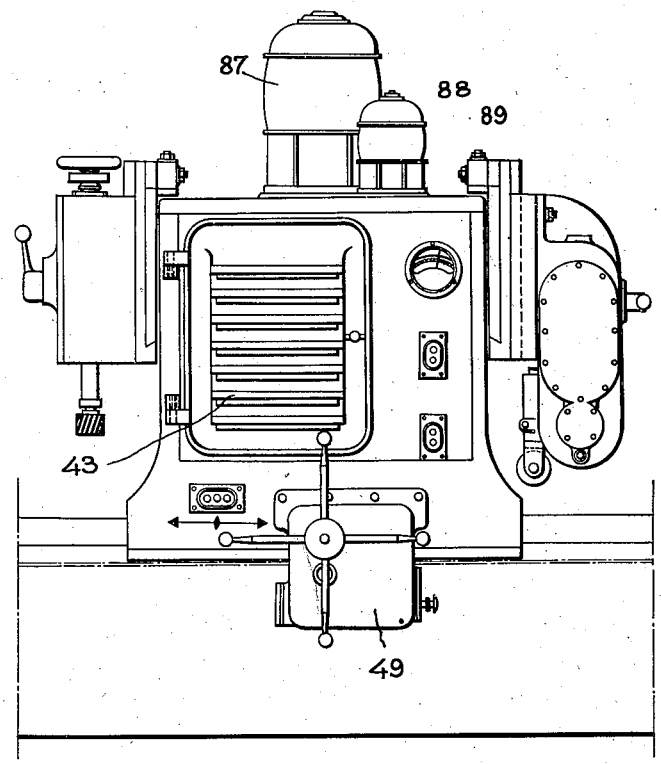
Fig. 11 is an end elevation of the saddle.
Figure 12:
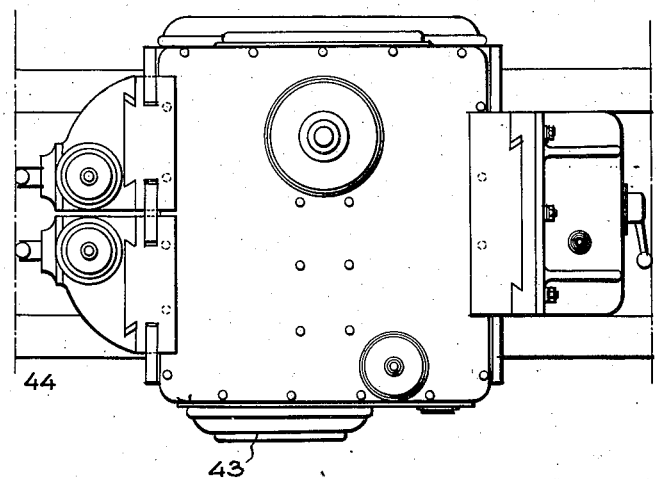
Fig. 12 is a plan view of the saddle.

The type of plate shown in Fig. 9 allows the lateral faces 21ᵇ of two angle members 21 to be machined simultaneously. In this type, the angle members 21, mounted on the wedges 29 are pressed against the machined faces 30 of the plate, by means of space blocks 31 between which acts a cam 32 journalled in a bearing 33 and angularly connected by means of a connecting rod and lever to the piston rod 34 of the cylinder 25. The securing in position of the angle members can be completed by bridges 35, locked on the plate by screws 36 pressing against the ribs 21ᵃ reinforced by shaped wedges 28.

Other types of plates for machining angle members other than those contemplated by way of examples, can obviously be devised.

The milling-cutters of the machine are of two types: a vertical spindle type; a horizontal spindle type.

Figure 15:
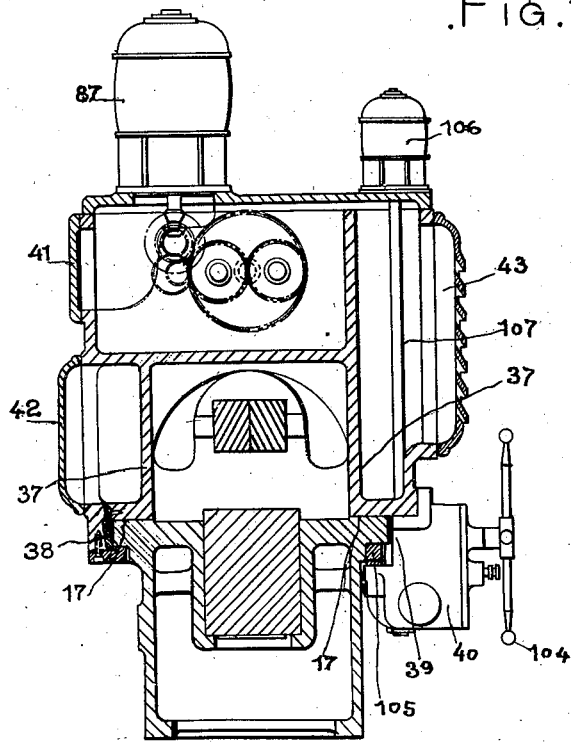
Fig. 15 is a vertical cross section of the carriage mounted on the bed of the machine.

Each type is mounted on a distinct movable head, all the heads being mounted, through the medium of a suitable carriage, on one and the same saddle. The latter is devised in the form of a bridge the lateral uprights 37 of which (Fig. 15) rest at their base on the slideways 17 of the bed. One of these uprights extends below the plane of the slideways 17 for ensuring the lateral guiding through the medium of wedging chocks 38 resiliently urged outwards in order to ensure the automatic taking up of the play, the bearing on the opposite side 39 of the bed taking place by means of a wedge provided on the frame 40, for the automatic and manual control of the feed, suitably secured on the saddle. The height of the saddle is maintained in any suitable manner and, for instance, by means of the well known platens.

The unit constituted by the saddle or bridge which has just been diagrammatically described in its essential lines, is moulded so as to provide casings the separating walls of which ensure a rugged ribbing of the whole. The upright 37 on the side where the feed frame 40 is located, or on the operator's side, constitutes a casing for the electric apparatus controlling the motors the functions of which will be described later on. The opposite upright contains the liquid oil pump for lubricating the milling-cutters. The upper part of the saddle forms a casing for the transmission or connection between the milling-cutter spindles and their control motor.

A door is provided at 41 through which access may be had for examining or changing the transmission gears. Doors 42 and 43 are also provided for the side casings. The arch comprised between the uprights 37 ensures complete visibility of the work and allows of simultaneously mounting four copying devices on the bed.

As above indicated, the movable heads are of two types: one having a vertical milling-cutter spindle, the other a horizontal spindle.

The vertical spindle type has a vertical approaching and adjusting movement and a transverse horizontal working movement controlled by a copying device.

The horizontal spindle type is semi-rotary having a transverse adjusting movement and vertical and pivoting working movements also controlled by a copying device.

The saddle is arranged to receive, at will, the following movable head combinations: two horizontal spindle heads; one horizontal spindle head and one vertical spindle head; one horizontal spindle head and two vertical spindle heads; four vertical spindle heads.

These combinations satisfy all the working conditions for machining angle members having a variable slope in the longitudinal direction and in the transverse direction.

The vertical spindle head proper (Fig. 18) comprises a frame 44 which supports the milling-cutter spindle 45 and which is mounted on a dovetail slideway 46 (Fig. 14) provided on a carriage 47 mounted on the saddle.

Figure 14:
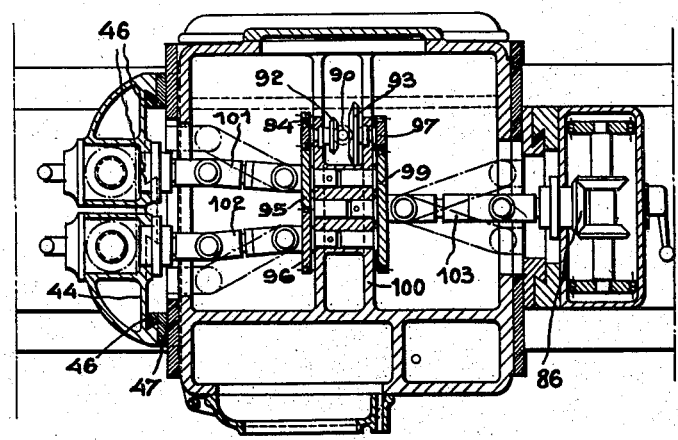
Fig. 14 is a partial horizontal section thereof.
Figure 16:
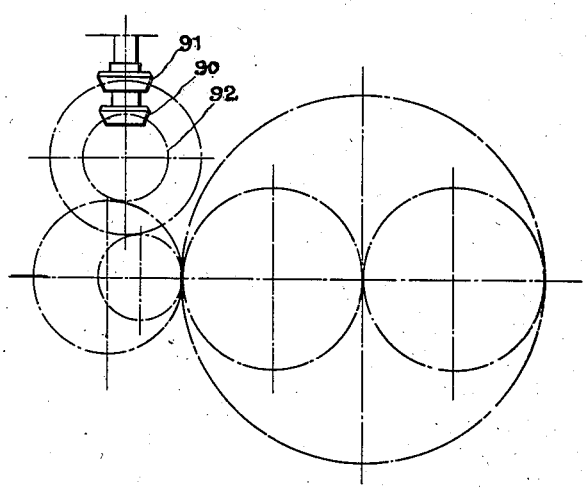
Fig. 16 is a diagram showing a part of the transmission controlling the milling-cutter spindles of the machine.

As shown in Fig. 14, two slideways 46 are provided on the carriage 47 so that, when necessary, two vertical spindle heads can be simultaneously mounted with the carriage; the axes of the spindles being offset on either side of the median plane of the carriage 47. The vertical adjustment of the heads 44 is effected by means of the abutment screws 48 (Fig. 18) screwed on the carriage and locked, if need be, by a lock-nut not shown.

The carriage can move transversely on the saddle on which it is guided by a lower dove-tail slideway 49, whereas at its upper part it bears: vertically through rollers 50; laterally through rollers 51, on horizontal and vertical guiding surfaces of the saddle.

The rollers 50 and 51 are advantageously constituted by outer rings of ball bearings mounted on arbors 52 and 53 capable of being set in eccentric gearings of the carriage on which they are locked in the suitable position.

Figure 13:
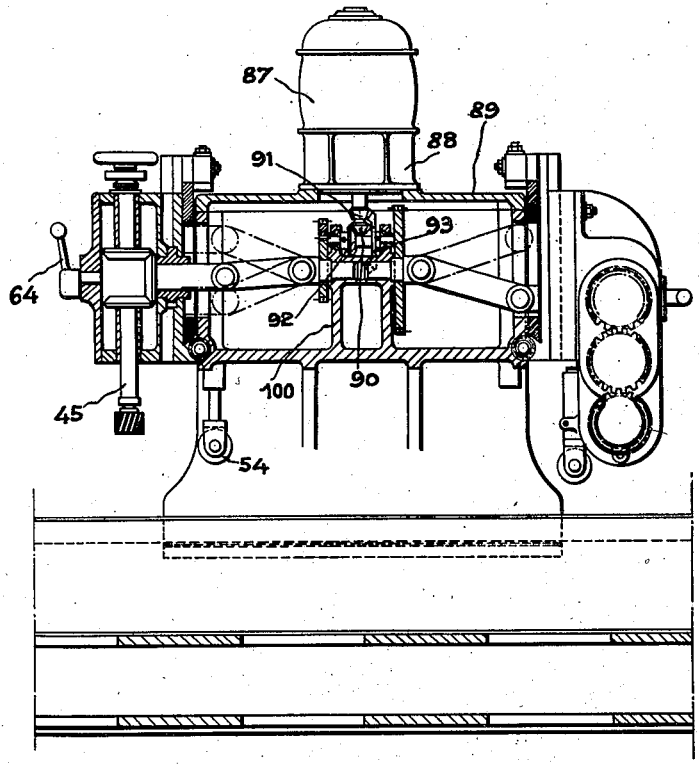
Fig. 13 is a partial longitudinal axial section of the saddle.
Figure 18:
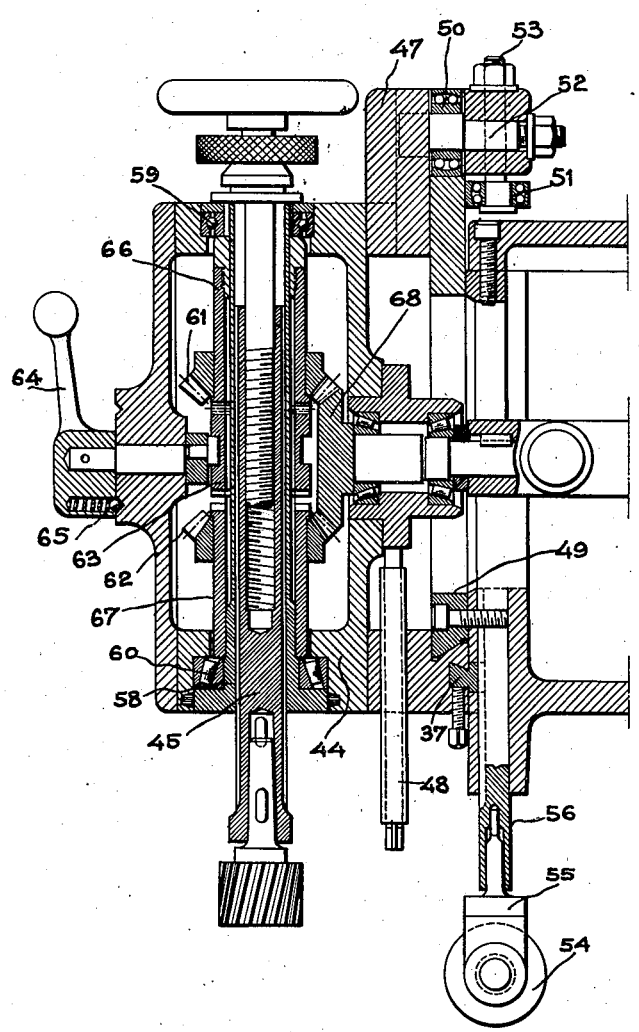
Fig. 18 is a vertical section of the vertical spindle head, of its carriage and of the end of the corresponding saddle.

The transverse displacements of the carriage 47 on the saddle are automatic and controlled by a copying path secured on the bed on which rolls a roller 54 mounted in a forked member 55 adjustably mounted in a slide-block 56 movable in a vertical conduit in the saddle and urged downwardly by a spring (not shown) toward the copying path (Figs. 13 and 18). Suitable means (not shown) may be employed for utilizing vertical displacements of the slide block 55 to impart horizontal displacements of equal or corresponding amplitude to the carriage 47.

The milling-cutter spindle 45 is mounted in a sleeve 58 in which it can slide while remaining in angular connection therewith. Said sleeve 58 is centered and indirectly supported by smooth bearings 59 and abutment bearings 60 and it is angularly connected to a dog-clutch 63 which an outer operating handle 64 provided with a latch 65, allows of engaging by means of suitable claws, with one or the other of the sleeves 66 and 67, freely mounted relatively to the spindle 45, and carrying bevel pinions 61 and 62 constantly meshing with a pinion 68 constantly driven in the same direction, as explained hereinafter. By acting on the handle 64, the spindles 45 can be rotated in one direction or in the other.

Figure 19:
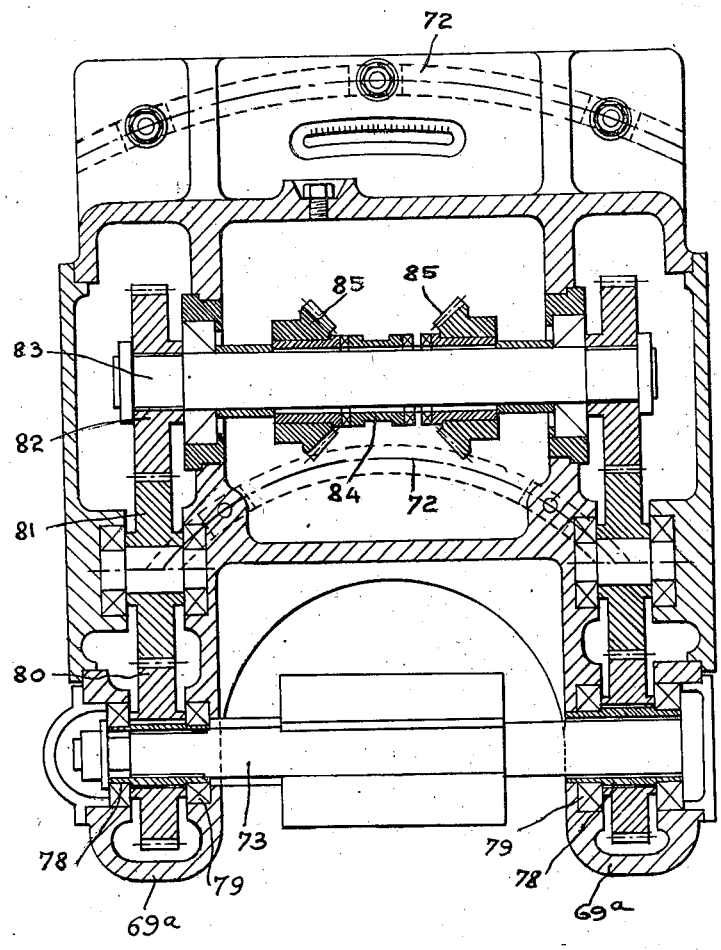
Fig. 19 is a cross section of the horizontal spindle head.
Figure 20:
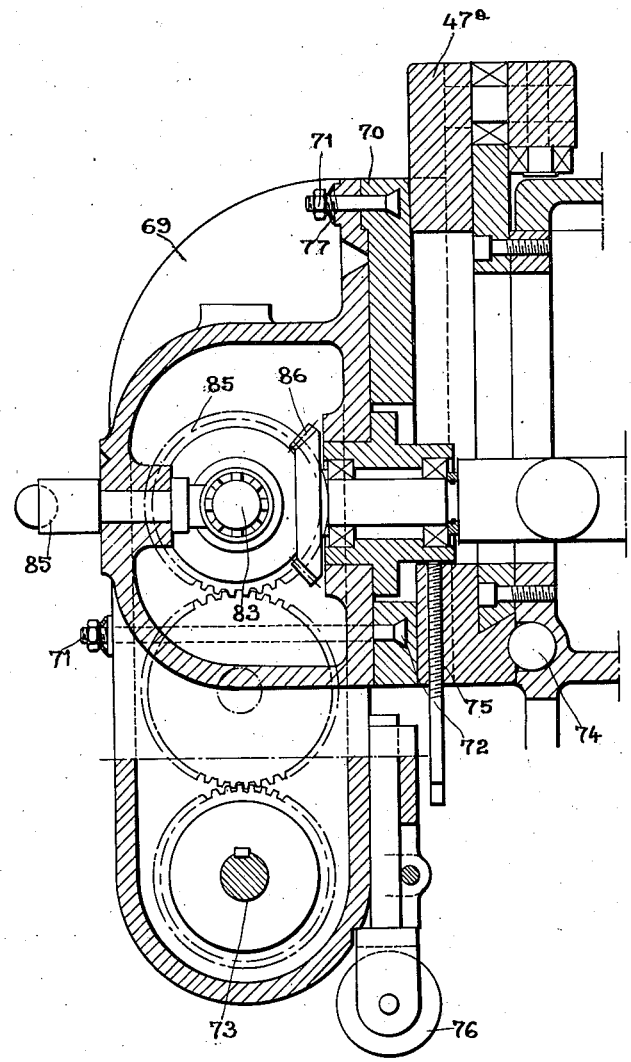
Fig. 20 is a vertical longitudinal section on an enlarged scale of the horizontal spindle head.

The horizontal spindle head (Figs. 19 and 20) comprises a frame 69, secured on a carriage 70 by bolts 71 the trapezoidal head of which is guided in grooves 72 formed in the carriage 70 and concentrically curved so as to allow of setting, at will, the milling-cutter spindle 73 about the common center of said head and spindle.

The carriage 70 is vertically guided by means of a dove-tail slideway on a second carriage 47ᵃ substantially similar to the carriage 47 of the vertical spindle head and mounted as the latter, on the saddle to be subjected to horizontal displacements transversely to the bed. However, in the case of the horizontal spindle head, the carriage 47ᵃ is manually adjusted by means of a worm 74 acting on a rack having inclined teeth and cut on the carriage.

The movement of the carriage 70 on the carriage 47ᵃ can be rendered free or blocked at will. In the first case, its position is limited in the downward direction by a screw 75. In the blocked condition, the movement is controlled by means of a roller 76 bearing on a suitable copying path.

The circular movement of the head 69 (Fig. 20) on the carriage 70 can also be free or locked. In the first case, the bolts 71 are loosened sufficiently, their locking depending for instance on Bellevill washers 77 and each of the arms 69ᵃ of the head (Fig. 19) carries adjustable rollers which roll on suitable copying paths. The milling-cutter spindle 73 is removably secured on two hollow journals 78 centered by means of bearings 79. It is driven by gears 80, 81, 82, from a shaft 83 meshing with a dog-clutch 84, actuated by a suitable handle, and which can be connected, at will, to one or the other of the bevel pinions 85 rigidly secured on sleeves freely mounted relatively to the shaft 83 and constantly in mesh with a driving pinion 86.

The control of all the milling-cutter spindles is ensured by one and the same electric motor 87 (Fig. 13) having a vertical axis secured through the medium of a support 88 to the upper part of the saddle, on the cover 89 of an upper central casing.

Figure 17:
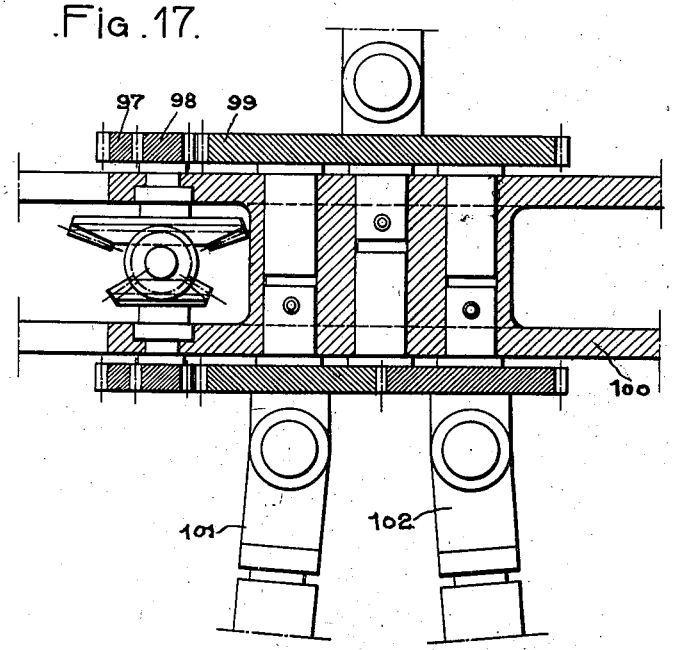
Fig. 17 is a horizontal axial section, on an enlarged scale, of the reducing device connected to the motor controlling the milling-cutter spindles.

The shaft of said motor engages, by means of a bevel pinion 90, with a bevel gear 92, and by means of a bevel pinion 91, with a bevel gear 93 (Fig. 13). The gear 92 is the first of a train of gears controlling the vertical spindles, said train being constituted by the gears 94—95 and 96 (Fig. 14). The gear 93 is the first of the train of gears controlling the horizontal spindle; said train comprises the gears 97, 98, 99 (Figs. 14 and 17). The gears of both these trains are journalled in a frame 100 and can be replaced by others for causing the ratio of the trains to vary.

The connection between the gears 95 and 96 and the pinions 68 of the vertical spindle head, respectively, takes place by means of double Cardan extensible shafts 101 and 102. The connection between the gear 99 and pinion 86 of the horizontal spindle head takes place through a shaft 103 of the same type as the preceding ones.

The control of the feed of the saddle on the bed is ensured by hand from a capstan 104 which controls the train of gears arranged in the casing 40 (Fig. 15) and connected to a pinion which rolls in the known manner for other machine-tools, on a rack 105 secured on the bed. It is automatically ensured by a separate electric motor 106 the shaft of which is extended at 107 up to the casing 40. Said motor advantageously rotates in two directions, two stroke limiting switches being provided on its supply circuit.

What I claim as my invention and desire to secure by Letters Patent is:

1. In a machine for milling airplane wing spars, a bed having an M-shaped cross section, vertical ribs arranged triangularly along said bed between the adjacent parts or sides forming the M and including means for supporting an I-shaped beam forming a table in the central recess of the M, means upon said bed for producing a variable longitudinal inclination of said table relatively to the bed, slideways on the bed for a saddle having a milling-cutter head at each end, means upon said bed for moving said saddle along the bed and means carried upon said bed for controlling the milling-cutters.

2. In a machine for milling airplane wing spars as claimed in claim 1, with plates for securing the spars adapted to be centered on the table by the engagement of a longitudinal rib in an axial groove of the table, the feature including pistons upon the bed actuated by a fluid under pressure for locking the spars on the plates.

3. In a machine for milling airplane wing spars, a bed having an M-shaped cross section, vertical ribs arranged triangularly along said bed between the adjacent parts or sides forming the M and including means for supporting an I-shaped beam forming a table in the central recess of the M, means upon said bed for producing a variable longitudinal inclination of said table relatively to the bed, slideways on the bed for a saddle in the shape of a bridge having a milling-cutter head at each end, means upon said bed for moving said saddle along the bed and means carried upon said bed for controlling the milling-cutters.

4. In a machine for milling airplane wing spars, a bed having an M-shaped cross section, vertical ribs arranged triangularly along said bed between the adjacent parts or sides forming the M and including means for supporting an I-shaped beam forming a table in the central recess of the M, means upon said bed for producing a variable longitudinal inclination of said table relatively to the bed, and slideways on the bed for a saddle having a movable head for a vertical spindle milling-cutter at one end and a movable head for a horizontal spindle milling-cutter at the other end.

5. In a machine for milling airplane wing spars, a bed having an M-shaped cross section, vertical ribs arranged triangularly along said bed between the adjacent parts or sides forming the M and including means for supporting an I-shaped beam forming a table in the central recess of the M, means upon said bed for producing a variable longitudinal inclination of said table relatively to the bed, slideways on the bed for a saddle having a milling cutter head at each end and an electric motor mounted at the upper part of said saddle with its shaft vertically arranged, a rack on said bed, gearing-down mechanism connected to said shaft and comprising a pinion meshing with said rack on the bed, said saddle having a milling-cutter head at each end of the same, and means on said bed for moving said saddle along the bed and means for controlling the milling-cutters.

6. In a machine for milling airplane wing spars as claimed in claim 5, a hand control capstan is mounted on one of the pinions of the reducing device, and means are provided for disengaging the electric motor from the reducing device.

EMILE JULIEN EUGÈNE DEWOITINE.